Oct. 24, 1939.  E. SCHNABEL  2,177,612
PROCESS OF PRODUCING HOMOGENEOUS SOLID ARTICLES FROM POLYVINYL ALCOHOL
Filed Dec. 16, 1937  3 Sheets-Sheet 1

Inventor:
Ernst Schnabel
By Williams, Rich & Morse
Attorneys.

Oct. 24, 1939.　　　　E. SCHNABEL　　　　2,177,612
PROCESS OF PRODUCING HOMOGENEOUS SOLID ARTICLES FROM POLYVINYL ALCOHOL
Filed Dec. 16, 1937　　　3 Sheets-Sheet 2

Inventor:
Ernst Schnabel
By Williams, Rich & Morse
Attorneys.

Oct. 24, 1939.  E. SCHNABEL  2,177,612
PROCESS OF PRODUCING HOMOGENEOUS SOLID ARTICLES FROM POLYVINYL ALCOHOL
Filed Dec. 16, 1937  3 Sheets-Sheet 3
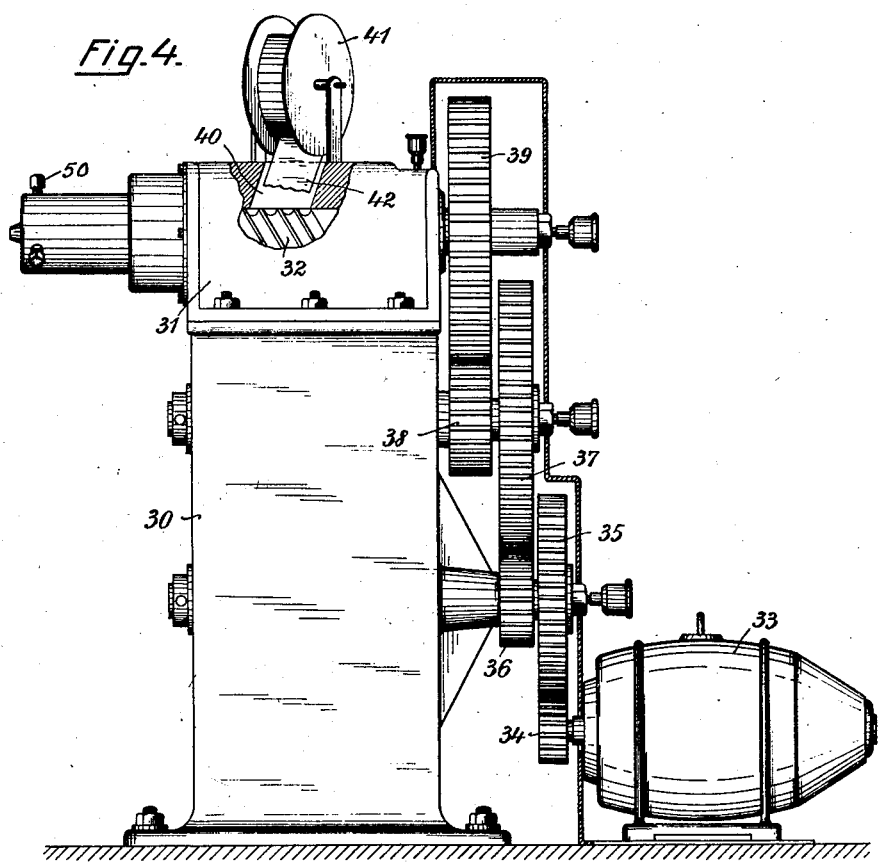
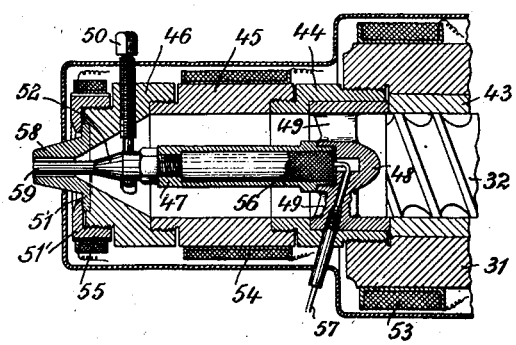
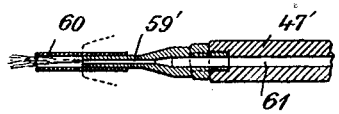
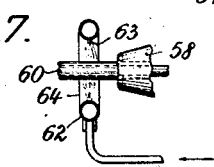
Inventor:
Ernst Schnabel
By Williams, Rich & Morse
Attorneys Patented Oct. 24, 1939

2,177,612

UNITED STATES PATENT OFFICE 2,177,612

PROCESS OF PRODUCING HOMOGENEOUS SOLID ARTICLES FROM POLYVINYL ALCOHOL

Ernst Schnabel, Berlin-Lichterfelde, Germany, assignor to Resistoflex Corporation, New York, N. Y., a corporation of New York Application December 16, 1937, Serial No. 180,168
In Germany October 5, 1935

4 Claims. (Cl. 18—48)

This invention relates to the production of solid homogeneous articles from polyvinyl alcohol or mixtures composed largely thereof. The term mixtures, as used herein, is intended to include mixed and co-polymers of which polyvinyl alcohol is a major constituent.

Raw polyvinyl alcohol is produced in the form of a powder or fine flakes or granules, all of which forms are referred to herein as "finely-divided particles".

The object of the present invention is to produce from polyvinyl alcohol or mixtures composed of a substantial proportion of polyvinyl alcohol various homogeneous articles which can be made by extruding or molding. A principal object is the production of extruded tubing.

The finely-divided particles of raw polyvinyl alcohol are non-coherent. Inasmuch as polyvinyl alcohol is soluble in water it has heretofore been the practice to dissolve it in water and produce articles such as thin films, threads, bands and thin-walled tubes of small diameter by extruding the solution into baths adapted to remove the water and cause solidification of the article, or by flowing the solution onto plates where the water was allowed to evaporate, leaving a film or thin sheet. By this method, however, only very thin bodies, of an order of about a hundredth of an inch, can be produced, because it is impracticable to remove the water from a thicker body with sufficient rapidity.

Attempts have also been made to produce articles from polyvinyl alcohol and mixtures thereof by making a so-called paste by adding to the material a sufficient amount of water to dissolve the raw material. The fact of dissolution in the paste is indicated by the fact that the individual particles of the material can no longer be distinguished. This paste has been formed into articles by pressing in heated molds in which it acquires the shape of the mold. Upon removal therefrom, the article stiffens to a solid article only after extended drying. It has become evident, however, that it is impracticable to produce satisfactory thick-walled articles in this way because of the difficulty of properly drying them without deleteriously changing their properties.

When it has been attempted to produce extruded articles such as tubing from such pastes, after the manner of producing rubber tubing, it has been found that a strongly adhesive mass is formed in the extruding machine which sticks to the inside of the apparatus as a result of which the machine wholly fails to operate.

The principal object of this invention is to provide a new process of working polyvinyl alcohol and mixtures thereof which makes possible the production of better articles, the successful extrusion of continuous articles of many kinds, the more rapid working of the raw material into finished articles, and the elimination of the necessity of removing excess solvent. Other objects and advantages will become apparent in the course of the following description.

This invention, in brief, consists in the discovery of a process of working polyvinyl alcohol and mixtures thereof in a substantially dry state by which the finely divided material is transformed into a solid homogeneous article without being first dissolved. The essential feature of this process is the subjection of the substantially dry raw material to a sufficiently intensive kneading with the application of heat and pressure.

By the expression "a substantially dry state" it is meant that the substance has added to it, prior to or during the kneading process, an amount of water or other suitable volatile solvents which is so slight that it does not, properly speaking, exert a dissolving action and does not in itself substantially alter the aggregate state of the powdered or granular or flaky material as such. The amount of solvent added is such that it is completely absorbed into the particles of polyvinyl alcohol. In other words the individual particles remain clearly distinguishable, though they may, to a slight extent, tend loosely to adhere to one another. The proportion of solvent to raw material is such that when the substantially dry material is subjected to intensive pressure, as by passing it between closely set rolls, which may be heated if necessary, the finely-divided particles will become coherent, forming a thin strip or pieces in which is contained enough solvent to result in a completely homogeneous final product but less solvent than will cause such adhesiveness as to prevent continuous extrusion.

In carrying out the invention, the raw material is first moistened with a small amount of water, the application being performed in such a manner as to assure its even distribution throughout the material. One effective way is to spray the water or other solvents on the material while constantly stirring it. Any fillers, plasticisers or other desired ingredients are added during this step.

The moistened material, which is still in the comminuted state, is then subjected to an intensive kneading with application of heat and pressure which causes the particles to cohere, forming a sort of cohesive agglomerate in which the particles become somewhat fused together. A preferred method of performing this operation is to run the prepared raw material between a pair of rolls, at least one of which is heated, between which there is a very small clearance of the order of a few thousandths of an inch. The material emerges from the rolls in the form of flakes, irregular pieces or as a continuous strip, depending upon the initial condition of the material, the heat and the pressure. It is usually desirable to put the material through the rolls several times until a uniform continuous strip is finally obtained which can readily be handled and cut up into smaller strips for use in subsequent operations.

During this rolling a somewhat homogeneous more or less continuous strip is formed which has an observable toughness and elasticity. That is to say a moderate pull will not rupture the strip. It is still apparent at this stage, however, that the strip is made up of separate particles fused together.

The completion of the process comprises the further treatment of this intermediate material in a chamber in which it is transformed by further pressure and heat into an entirely homogeneous body.

To clarify the further description, suitable apparatus by which an embodiment of the invention may be carried out will now be described. Referring to the drawings:

Fig. 4 is a front elevation of a complete extruding machine, partly in section;

Fig. 5 is a central vertical section through the extruding head of the machine shown in Fig. 4;

Fig. 6 is a longitudinal section of a modified form of mandrel, and

Fig. 7 shows a device for spraying the extruded article on the outside as it leaves the extruding head.

Figure 1:
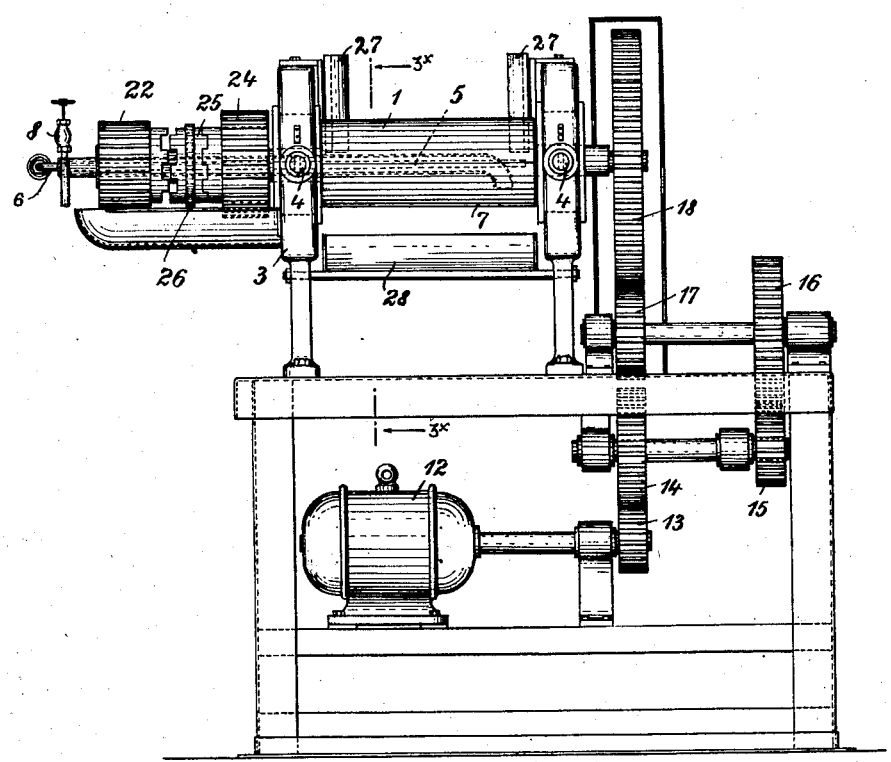
Fig. 1 is a front elevation of rolling mechanism suitable for carrying out the kneading steps of the process.
Figure 2:
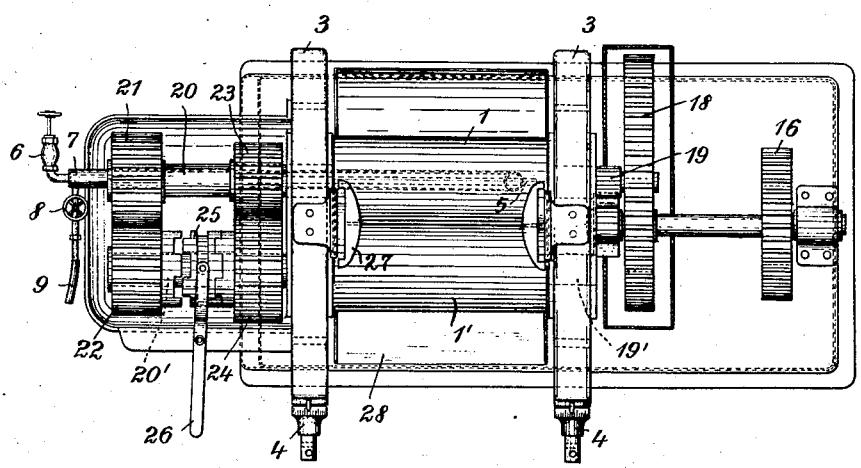
Fig. 2 is a top plan view of the same machine.
Figure 3:
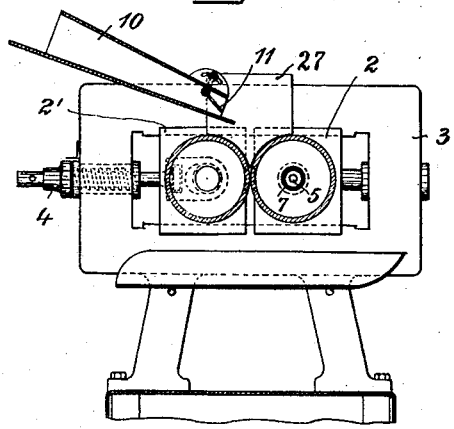
Fig. 3 is a section taken on the line 3˟—3˟ of Fig. 1.

Referring to Figs. 1 to 3, 1 and 1' indicate a pair of horizontally mounted rollers, which, together with their axles 19, 20 and 19', 20', respectively, are mounted in metal blocks 2 and 2'. The blocks rest in the frames 3, and are adjustable in a horizontal direction so that the space between the rollers may be altered to meet requirements. For the rapid adjustment of the space between the rollers there are the threaded spindles 4, which engage with the blocks 2' and which are disposed in the front part of the frame 3.

With the example of construction that is illustrated, the rollers 1 and 1' are made hollow. Through the hollow axle 20 there is led in a steam pipe 5, which has a valve 6 to adjust the amount of steam supplied. The steam can flow out of the open end of the pipe 5 into the hollow space of the roller. The condensate that collects in the lower part of the hollow space is forced into the tube 7, which surrounds the supply pipe 5; the hot water that is conveyed away flows through a regulating element 8 into the discharge pipe 9. Both rollers may be heated by this means if desired.

Above the rollers there is a feed device for the material to be worked. This may for example consist of a diagonally disposed filling funnel 10, with an adjustable flap 11 serving to regulate the supply. The material drops from the adjustable slot of the feed device directly into the narrow space between the rollers 1 and 1'.

The drive of the rollers is effected by the motor 12 through a number of gears 13, 14—15, 16—17, 18. The last gear 18 is mounted on the axle 19 of the roller 1. The rotary movement is transmitted from this roller to the roller 1' by means of the transmission disposed on the axles 20, 20'. The transmission consists of two pairs of gears 21, 22, and 23, 24. The gears 21, 22 have the same diameter, and the gears 23, 24 have unequal diameters. By means of the dog clutch 25, which may be shifted by a hand lever 26, either the one or the other of the pairs of transmission gears may be set into action, depending upon whether the rollers are to be driven with the same speed or with unequal speeds.

After it has passed through the rollers the processed material drops on to the lower pan 28. Before being initially passed through the rollers, the raw material is in powdered or flaky form and has been moistened with water or other solvents in an amount sufficient to cause cohesion of the particles, as herein described. By passing it one or more times through the rollers, a continuous band may finally be produced which can be cut into strips and wound up on reels, which reels can be suspended on the extruder so that the unwinding may be effected automatically by the press's conveyor screw.

The extruding machine is shown in Fig. 4. It is similar in construction to known extruding machines for manufacturing rubber hose, but preferably varies from it however in certain respects as is shown in Figs. 5 to 7. Upon the support 30 there is mounted the housing 31, inside which the screw 32 is housed that feeds the supplied material and compresses it into a chamber in which it is subjected to the action of pressure and heat. The screw 32 is driven by a motor 33 by means of the pairs of gears 34—35, 36—37, 38—39. For the introduction of the material, the housing 31 is provided withh the opening 40. Above or near this opening a reel 41 may be supported on the housing 31, from which reel the strip 42 is unwound. When the end of the strip 42 that is passed into the opening 40 is gripped by the screw 32, and carried along with it, the strip unwinds automatically at a rate corresponding to that with which the extruded material leaves the machine.

The formation of a homogeneous mass and the production of a tube or other extruded article proceeds in the so-called "head" of the machine, which is shown in more detail in Fig. 5. The screw 32 is mounted in a sleeve 43, which is set in the housing 31. Into this housing there is screwed the container, which preferably is built up of a number of parts 44, 45, 46, which forms a chamber for receiving the material fed up by the screw 32. Inside this space there is disposed the mandrel 47, which is streamlined at the end 48 nearest the screw 32, and which is there supported by the webs 49. The front end of the mandrel 47 may be exactly centered by means of the three adjusting screws 50. The part 46, which forms the front part of the chamber, is tapered toward the outlet on its inside, and contains an interchangeable mouthpiece 51, held in place by a retaining ring 51', the opening of which mouthpiece determines the outside diameter of the tubing. The mandrel 47 also carries at its front end an interchangeable extension 52 which determines the inside diameter of the tubing.

The sleeve 43 and the aforesaid chamber are preferably capable of being heated not only from the outside but also from the inside. In the construction shown, electrical heating is provided. The housing 31, together with the middle part 45 of the three-part container and the front part 46 of this container are each provided with surrounding heating coils 53, 54 and 55. The current that flows through the three coils should preferably be adjustable, in order to make it possible to regulate the temperature in the successive spaces according to requirements. In addition to this, the mandrel 47, which for this purpose is made detachable from its rear part 48, is provided inside with an electrical heating element 56, whose wires 57 are carried through one of a number of the supporting webs 49. The heating of the mandrel should also be independently adjustable.

An important feature which may be seen in the drawing is the construction of the mouthpiece 51 and the end 52 of the mandrel. The mouthpiece 51 is provided with an extended tip 58 having an elongated passage therethrough. The part 52 of the mandrel has a rod-like extension 59. The two parts 58 and 59 form an elongated cylindrical slot the length of which is at least as great as its outer diameter and preferably is a multiple of its diameter. In this wise the two parts 58 and 59 form heated guide walls for the substance coming out in tubular form.

The outside heating of the housing may be effected by steam or hot water instead of electricity in which case the housing is provided with suitable jacket spaces. The heating of the mandrel, however, is preferably by electricity, because there are difficulties in disposing the requisite supply and discharge lines for water or steam passages without creating a considerable obstruction to the free passage of material.

The machine may readily be equipped in known manner with appropriate thermometers for indicating internal temperatures at various points to facilitate regulation of the heating.

In Fig. 6 there is illustrated a form of construction of the mandrel in which it is adapted for use in spraying the inside of the tubing 60 coming from the machine with steam, air or solvent, in the event that this might be advantageous. If steam is being used, the mandrel could be heated by steam without difficulty because the mandrel 47' and its rod-like extension 59' need to contain only one heating channel 61, the discharge being through the tubing 60, no other discharge passage being needed.

In Fig. 7 an annular pipe 62 is shown, which by means of inner openings 63 can be used to spray steam, air or solvent 64 on to the outside of the tubing 60 as it emerges from the nozzle 58, for purposes hereinafter described.

If a finished hose or a cable is to be covered with an extruded casing then a machine somewhat different from that shown in Fig. 4 would be used in which the head is disposed diagonally to the screw housing, in a manner known in the art in connection with rubber extruding machines, so as to permit the article to be covered to be fed through the extruding head.

With the foregoing apparatus in mind, the description of the process carried out by means thereof will be continued.

If the material put into the extruding machine of Fig. 4 is a viscous solution or a paste of polyvinyl alcohol containing a large proportion of water, a strongly adhesive mass is formed in the machine which sticks to the conveyor screw 32 just as though it were integral with it, as a result of which the machine fails entirely to operate. This kind of breakdown is absolutely eliminated if the polyvinyl alcohol that is fed to the extruding machine is in the form of a web or strip of cohering particles described above which can be fed into the machine and carried along without interruption by the conveyor screw. This preliminary treatment entirely avoids the mass being converted, in the conveyor screw and under the pressure and temperature conditions prevailing there, into a state in which it gums up the helix of the conveyor screw. This strip is drawn in and fed along by the conveyor screw without becoming adhesive and is converted by the pressure and heat into a completely homogeneous mass. The thickness and width of the strip are preferably so dimensioned that the amount of substance fed to the machine within a certain period of time corresponds with the amount of material leaving the nozzle in the same period in the form of an extruded article. As a consequence, a detrimental congestion of material, a plugging up or the like, does not occur.

As a typical embodiment of the invention, the preferred procedure followed in making an extruded article from polyvinyl alcohol will now be described. To convert this material into a homogeneous flexible mass it should contain about 10% of its weight of water. This is absorbed into the material and appears to promote the cohesion and homogenizing of the particles without dissolving them.

The preliminary treatment preferably proceeds as follows: The powdery raw material is thoroughly mixed with from 20% to 50% of its weight of water, the reason for using the larger amount being that an excess is needed to bring about the desired cohesion of the particles during the subsequent rolling step. The solvent in excess of that desired in the extruded or moulded product is removed by evaporation during the rolling and may readily be controlled during that step to produce an intermediate product most suitable for use in the subsequent operations. Softening agents or plasticizers and filling or coloring materials, if they are to be included, are mixed in at the same time. This mixture, which is still in a finely divided state, the water having been absorbed into the particles, is put through the machine of Fig. 1, at least one of the rolls being heated to about 60° or 80° C., a temperature below the boiling point of the solvent, water. By running the two rolls at different speeds the material is more thoroughly mixed and rubbed together, though they may be run at the same speed with satisfactory results.

The rolls are set a few thousandths of an inch apart and the material emerges from them, somewhat coherent, in strips or pieces which are fed through the rolls again. This rolling operation is not the usual milling or "working up" on rolls as customarily practiced with rubber and other plastics. The material is not permitted to adhere to either roll but is passed between them in one or more single passes. With each passage through the rolls the material becomes more coherent and finally emerges as a fairly uniform strip which can easily be handled due to its inherent strength. The number of passes through the rolls and their temperature must be so regulated that the final strip contains the minimum water content required to produce a homogeneous final product. That is, it should not be dried out too much. Neither should it be so wet as to become adhesive in the extruder. The final strip which is the width of the rolls may be cut into narrower strips of a width suitable for feeding into the extruding machine and loaded on reels. A large part of the solvent has evaporated by this time, the amount having been reduced to such an extent that there is no chance of the material becoming adhesive in the extruder. The strip appears to be quite dry and tough, the particles being strongly coherent.

With respect to the removal of excess solvent and regulation of the solvent content in the rolling step, it is to be noted that water and other solvents for polyvinyl alcohol are fairly volatile. When the material is rolled it becomes warm through friction and additional heat may be supplied as desired. The rolled intermediate product, which is in thin sheet-like form, loses solvent by evaporation and the hotter it is the more it loses. Knowing the weight of the original batch, it is a simple matter to determine, by weighing the rolled product, just how much solvent has been lost. Skilled operators can also determine the proper solvent content by inspection. The solvent-expelling temperature of the rolls may be raised or lowered, and the number of passes through the rolls may be selected, to precisely regulate the evaporation of the solvent.

The strips formed by this preliminary treatment contain the various constituents mixed in the correct ratio for the production of a homogeneous mass and the extrusion of the finished article and they can be fed into the extruder at once or may be stored for future use, in the latter case it being advisable to protect them from exposure to the air to prevent evaporation or absorption of moisture.

Whether a continuous strip or discontinuous pieces emerge from the rolls depends upon how the material is fed to the rolls, the number of passes, the initial solvent content and the temperature. It is of course preferred to produce a continuous strip because it can be cut into bands which will automatically be drawn into a screw-type extruder by the rotation of the feed screw and such bands can be so proportioned as to give any desired rate of feed. It is to be understood, however, that the invention is not limited to the production of a continuous strip but resides in the treatment which the material receives in the rolling step. The invention therefore includes the production of an intermediate product in the manner described whether this product is in one piece or many pieces.

The final conversion of the material into a completely homogeneous mass of great toughness, resiliency and increased chemical resistance takes place during its passage through the pressure chamber of the extruder wherein it is subjected to high pressure and heat. It will be noted from Fig. 5 that between the end of the screw 32 and the nozzle 58 there is a chamber capable of containing a substantial mass of material, as compared with the area of the extruding orifice, which mass will flow relatively slowly. The extrusion of this plastic mass requires considerable pressure and at the same time heat is applied by means of the external and internal heating elements to produce a uniform temperature throughout the mass. The heating means are regulated while watching the extruded article so as to produce the temperature which results in the most perfectly homogeneous product, which temperature will be found to vary somewhat according to the material being worked. It has been found by numerous experiments that it is especially important to bring the mass quickly to a uniform temperature throughout. The internal heating element is useful for this purpose, particularly if the internal space in the machine is large.

The excellence of the product is moreover dependent upon not exceeding the small amount of water or other solvent required for plastification. If this amount is exceeded, it may happen that the extruded article is too soft and does not have sufficient strength to prevent it from collapsing or changing its shape after it leaves the machine. By introducing into the machine a material which contains no more water or other solvents than is required to bring about complete homogeneity and plastification, under the conditions of temperature and pressure therein obtaining, the article leaving the nozzle is sufficiently stiff to be self-sustaining even if it has but a relatively thin wall and yet it is sufficiently solidified and dry, even if it is relatively thick.

In order to assure that the extruded article keeps its shape, it is advisable to extend the nozzle and mandrel so that the material has to pass for a certain distance between heated walls after it has been caused to assume its final shape. It has been found that this distance should be at least equal to the diameter, and preferably a multiple of the diameter, of the finished article. During its passage through the heated walls, the article loses much of its plasticity.

In case the opposite difficulty is met and it is found that the extruded article has been deficient in water and is not entirely homogeneous in that it still contains distinguishable particles, it may be desirable to subject the article while still hot, immediately upon leaving the machine, to a treatment with steam which is capable of producing better homogeneity. For this purpose the devices of Figs. 6 and 7 are provided with which the article can be sprayed inside or outside or both.

If a molded article is to be made instead of an extruded article, the intermediate web or strip, formed as explained above, may be cut up into appropriate size and shape and placed in a suitable heated mold wherein it is subjected to heat and pressure until it becomes a homogeneous body. In this manner gaskets, washers and other articles may be formed.

While the invention herein described has been explained in conjunction with certain machines adapted for carrying out the process, they have been set forth merely by way of example and not as essential to the invention. It will be apparent that other apparatus may be equally suitable for the practice of the invention as defined in the appended claims.

What is claimed is:

1. The process of producing an intermediate product for use in charging an extruder or mould in forming articles which have a basis of polyvinyl alcohol containing a predetermined amount of solvent, which comprises uniformly distributing throughout a mass of finely divided dry polyvinyl alcohol such an amount of volatile solvent for the alcohol as will be absorbed into the particles without substantially affecting their aggregate state but in excess of that desired in the final product and sufficient to result in cohesion of the particles of alcohol during the rolling step, and thereafter pressing the moistened material between closely set rolls in one or more single passes therethrough at a solvent-expelling temperature below 100° C. to form a thin coherent strip and to remove excess solvent reducing it to the proportion desired in the extruded or moulded article.

2. The process of making homogeneous extruded articles which have a basis of polyvinyl alcohol containing a predetermined amount of solvent, which comprises uniformly distributing throughout a mass of finely divided dry polyvinyl alcohol such an amount of volatile solvent for the alcohol as will be absorbed into the particles without substantially affecting their aggregate state but in excess of that desired in the final product and sufficient to result in cohesion of the particles of alcohol during the rolling step, pressing the moistened material between closely set rolls in one or more single passes therethrough at a solvent-expelling temperature below 100° C. to form a thin coherent strip and to remove excess solvent reducing it to the proportion desired in the extruded article, and feeding said strip into and through an extruder in which it is subjected to such conditions of heat and pressure as will convert the material of said strip into a completely homogeneous product.

3. The process of making homogeneous moulded articles which have a basis of polyvinyl alcohol containing a predetermined amount of solvent, which comprises uniformly distributing throughout a mass of finely divided dry polyvinyl alcohol such an amount of volatile solvent for the alcohol as will be absorbed into the particles without substantially affecting their aggregate state but in excess of that desired in the final product and sufficient to result in cohesion of the particles of alcohol during the rolling step, pressing the moistened material between closely set rolls in one or more single passes therethrough at a solvent-expelling temperature below 100° C. to form a thin coherent strip and to remove excess solvent reducing it to the proportion desired in the moulded article, and moulding the material thus produced under such conditions of heat and pressure as will convert the material of said strip into a completely homogeneous product.

4. The process of producing an intermediate product for use in charging an extruder or mould in forming articles which have a basis of polyvinyl alcohol containing a predetermined amount of solvent, which comprises uniformly distributing throughout a mass of finely divided dry polyvinyl alcohol such an amount of volatile solvent for the alcohol as will be absorbed into the particles without substantially affecting their aggregate state but in excess of that desired in the final product and sufficient to result in cohesion of the particles of alcohol during the rolling step, and thereafter pressing the moistened material between closely set rolls in one or more single passes therethrough at a solvent-expelling temperature below 100° C. to cause the particles to cohere and to remove excess solvent reducing it to the proportion desired in the extruded or moulded article.

ERNST SCHNABEL.